US007813699B2

(12) United States Patent
Ho et al.

(10) Patent No.: US 7,813,699 B2
(45) Date of Patent: Oct. 12, 2010

(54) TRANSCEIVER REDUNDANCY IN AN ELECTRONIC TOLL COLLECTION SYSTEM

(75) Inventors: Thua Van Ho, Mississauga (CA); Daniel Terrier, Toronto (CA); Roger Tong, Oakville (CA); Wai-Cheung Tang, Mannheim (CA); Japjeev Kohli, Waterloo (CA)

(73) Assignee: Mark IV Industries Corp., Mississauga, Ontario (CA)

( * ) Notice: Subject to any disclaimer, the term of this patent is extended or adjusted under 35 U.S.C. 154(b) by 0 days.

(21) Appl. No.: 12/571,033

(22) Filed: Sep. 30, 2009

(65) Prior Publication Data

US 2010/0022202 A1 Jan. 28, 2010

Related U.S. Application Data

(63) Continuation of application No. 11/534,052, filed on Sep. 21, 2006, now abandoned.

(60) Provisional application No. 60/718,742, filed on Sep. 21, 2005, provisional application No. 60/718,743, filed on Sep. 21, 2005, provisional application No. 60/718,744, filed on Sep. 21, 2005.

(51) Int. Cl.
*H04B 7/00* (2006.01)

(52) U.S. Cl. ........................ 455/41.2; 455/558; 455/96; 455/99; 455/345; 340/931; 340/572.1; 235/348

(58) Field of Classification Search ................ 455/41.2, 455/558, 96, 99, 345, 418, 407, 408; 340/391, 340/505, 572.1; 235/384, 382
See application file for complete search history.

(56) References Cited

U.S. PATENT DOCUMENTS

| | | | | |
|---|---|---|---|---|
| 4,090,034 | A * | 5/1978 | Moylan | 379/115.01 |
| 4,104,630 | A | 8/1978 | Chasek | |
| 4,303,904 | A | 12/1981 | Chasek | |
| 4,870,419 | A | 9/1989 | Baldwin et al. | |
| 4,937,581 | A | 6/1990 | Baldwin et al. | |

(Continued)

FOREIGN PATENT DOCUMENTS

WO WO 9933027 7/1997

*Primary Examiner*—Minh D Dao
(74) *Attorney, Agent, or Firm*—Hanley, Flight & Zimmerna, LLC.

(57) ABSTRACT

An electronic toll collection system wherein the reader includes a switching network and a plurality of transceivers operating under the control of a controller. The reader further includes failure detection circuitry for determining whether any of the transceivers have failed based upon the RF outputs of the transceivers. If the controller determines that a transceiver has failed, then it alters the switching pattern such that the switching network excludes the failed transceiver from being connected to the antennas. The reader thereby provides for adaptive RF channel assignment, as the particular transceiver used to excite a particular antenna may be dynamically altered, and the provision of at least two transceivers in the reader ensures transceiver redundancy.

15 Claims, 4 Drawing Sheets

U.S. PATENT DOCUMENTS

| | | | | |
|---|---|---|---|---|
| 5,086,389 | A | 2/1992 | Hassett et al. | |
| 5,132,687 | A | 7/1992 | Baldwin et al. | |
| 5,144,553 | A | 9/1992 | Hassett et al. | |
| 5,164,732 | A | 11/1992 | Brockelsby et al. | |
| 5,196,846 | A | 3/1993 | Brockelsby et al. | |
| 5,253,162 | A | 10/1993 | Hassett et al. | |
| 5,266,947 | A | 11/1993 | Fujiwara et al. | |
| 5,289,183 | A | 2/1994 | Hassett et al. | |
| 5,310,999 | A | 5/1994 | Claus et al. | |
| 5,351,187 | A | 9/1994 | Hassett | |
| 5,422,473 | A * | 6/1995 | Kamata | 235/384 |
| 5,424,727 | A | 6/1995 | Shieh | |
| 5,425,032 | A | 6/1995 | Shloss et al. | |
| 5,485,520 | A | 1/1996 | Chaum et al. | |
| 5,525,991 | A | 6/1996 | Nagura et al. | |
| 5,602,375 | A | 2/1997 | Sunahara et al. | |
| 5,640,156 | A | 6/1997 | Okuda et al. | |
| 5,648,767 | A | 7/1997 | O'Connor et al. | |
| 5,657,008 | A | 8/1997 | Bantli | |
| 5,675,342 | A | 10/1997 | Sharpe | |
| 5,701,127 | A | 12/1997 | Sharpe | |
| 5,748,106 | A | 5/1998 | Schoenian et al. | |
| 5,751,973 | A | 5/1998 | Hassett | |
| 5,771,021 | A | 6/1998 | Veghte et al. | |
| 5,777,565 | A | 7/1998 | Hayashi et al. | |
| 5,805,082 | A | 9/1998 | Hassett | |
| 5,819,234 | A | 10/1998 | Slavin et al. | |
| 5,831,547 | A | 11/1998 | Ohtsuki et al. | |
| 5,841,866 | A | 11/1998 | Bruwer et al. | |
| 5,850,191 | A | 12/1998 | Yagi et al. | |
| 5,857,152 | A | 1/1999 | Everett | |
| 5,859,415 | A | 1/1999 | Blomqvist et al. | |
| 5,872,525 | A | 2/1999 | Fukasawa et al. | |
| 5,940,006 | A | 8/1999 | MacLellan et al. | |
| 5,963,149 | A | 10/1999 | Nagura et al. | |
| 6,025,799 | A | 2/2000 | Ho et al. | |
| 6,042,008 | A * | 3/2000 | Ando et al. | 235/384 |
| 6,081,718 | A | 6/2000 | Ando et al. | |
| 6,085,805 | A | 7/2000 | Bates | |
| 6,121,880 | A | 9/2000 | Scott et al. | |
| 6,191,705 | B1 | 2/2001 | Oomen et al. | |
| 6,219,613 | B1 | 4/2001 | Terrier et al. | |
| 6,390,365 | B1 | 5/2002 | Karasawa | |
| 6,616,034 | B2 | 9/2003 | Wu et al. | |
| 6,661,339 | B2 | 12/2003 | Muirhead | |
| 6,661,352 | B2 | 12/2003 | Tiernay et al. | |
| 6,690,293 | B2 | 2/2004 | Amita | |
| 6,725,014 | B1 | 4/2004 | Voegele | |
| 6,898,753 | B2 | 5/2005 | Bonifas | |
| 6,943,678 | B2 | 9/2005 | Muirhead | |
| 7,082,359 | B2 * | 7/2006 | Breed | 701/36 |
| 7,103,460 | B1 * | 9/2006 | Breed | 701/29 |
| 7,232,064 | B1 * | 6/2007 | Toohey | 235/384 |
| 7,324,015 | B1 * | 1/2008 | Allen et al. | 340/933 |
| 7,512,236 | B1 | 3/2009 | Zhu | |
| 2001/0050922 | A1 | 12/2001 | Tiernay et al. | |
| 2005/0203697 | A1 * | 9/2005 | Dalgleish | 701/117 |
| 2005/0237184 | A1 | 10/2005 | Muirhead | |
| 2005/0241548 | A1 | 11/2005 | Muirhead | |
| 2006/0025897 | A1 * | 2/2006 | Shostak et al. | 701/1 |
| 2006/0071816 | A1 | 4/2006 | Tang et al. | |
| 2006/0176153 | A1 | 8/2006 | Tang | |
| 2006/0180371 | A1 * | 8/2006 | Breed et al. | 180/197 |
| 2006/0220794 | A1 | 10/2006 | Zhu | |
| 2006/0243174 | A1 | 11/2006 | Muirhead | |
| 2006/0255967 | A1 | 11/2006 | Woo et al. | |
| 2006/0255968 | A1 | 11/2006 | Woo et al. | |
| 2006/0278705 | A1 * | 12/2006 | Hedley et al. | 235/384 |
| 2006/0284839 | A1 * | 12/2006 | Breed et al. | 345/156 |
| 2007/0008184 | A1 | 1/2007 | Ho et al. | |
| 2007/0022008 | A1 * | 1/2007 | Kingsborough et al. | 705/14 |
| 2007/0022046 | A1 * | 1/2007 | Kingsborough et al. | 705/39 |
| 2007/0022047 | A1 * | 1/2007 | Kingsborough et al. | 705/39 |
| 2007/0063872 | A1 | 3/2007 | Ho et al. | |
| 2007/0075839 | A1 | 4/2007 | Ho et al. | |
| 2007/0118273 | A1 | 5/2007 | Tang et al. | |
| 2007/0137531 | A1 | 6/2007 | Muirhead | |
| 2007/0222607 | A1 | 9/2007 | Ho et al. | |
| 2007/0268140 | A1 | 11/2007 | Tang et al. | |
| 2008/0143555 | A1 * | 6/2008 | Allen et al. | 340/933 |
| 2009/0043441 | A1 * | 2/2009 | Breed | 701/29 |

* cited by examiner

TRANSCEIVER REDUNDANCY IN AN ELECTRONIC TOLL COLLECTION SYSTEM

RELATED APPLICATIONS

The present application is a continuation of U.S. patent application Ser. No. 11/534,052, filed on Sep. 21, 2006, which claims priority to U.S. provisional patent application No. 60/718,742, filed on Sep. 21, 2005, U.S. provisional patent application No. 60/718,743, filed on Sep. 21, 2005, and U.S. provisional patent application No. 60/718,744, filed on Sep. 21, 2005, which are hereby incorporated herein in their entireties.

FIELD OF THE INVENTION

The present invention relates to electronic toll collection systems and, in particular, an electronic toll collection system configured to detect transceiver failure and adaptively switch transceivers.

BACKGROUND OF THE INVENTION

Electronic toll collection systems conduct toll transactions electronically using RF communications between a vehicle-mounted transponder (a "tag") and a stationary toll plaza transceiver (a "reader"). An example of an electronic toll collection system is described in U.S. Pat. No. 6,661,352 issued Dec. 9, 2003 to Tiernay et al., and owned in common with the present application. The contents of U.S. Pat. No. 6,661,352 are hereby incorporated by reference.

In a typical electronic toll collection (ETC) system, a set of antennas are disposed to cover the roadway with overlapping coverage zones. Each antenna broadcasts a wakeup or trigger RF signal within its coverage zone. A tag on a vehicle passing through the coverage area or zone detects the wakeup or trigger signal and responds with its own RF signal. The tag responds by sending a response signal containing information stored in memory in the transponder, such as the transponder ID number. The response signal is received by the antenna.

The antennas operate under the control of a reader that typically uses time multiplexing to scan the roadway for transponders using each antenna in turn. When an antenna receives a response signal, the response signal is input to the reader, which may then conduct an electronic toll transaction, such as by debiting a user account associated with the transponder ID number. The reader may then cause the antenna to broadcast a programming RF signal to the tag. The programming signal provides the tag with updated information for storage in its memory. It may, for example, provide the tag with a new account balance.

In one electronic toll collection system, the reader may include a single RF transceiver, a multiplexer, and a controller. The controller controls operation of the RF transceiver and conducts the toll transactions. The controller may cause the multiplexer to selectively connect the RF transceiver to each of the antennas in turn, thereby implementing time multiplexed scanning. It will be appreciated that failure of the RF transceiver results in a total loss of coverage.

In another electronic toll collection system, the reader may include an RF transceiver for each antenna. In this case, a failure of an RF transceiver causes a loss of coverage corresponding to the coverage area of the antenna connected to the failed transceiver. This may mean that a lane within the roadway has no effective coverage. This loss of coverage may be difficult to detect, since the majority of the system remains operational. Accordingly, the defect may persist for days without discovery. This is especially so in cases where there is overlapping coverage, such as where a lane is partly served by a center-lane antenna and mid-lane antennas on either side.

It would be advantageous to have an improved electronic toll collection system.

SUMMARY OF THE INVENTION

The present invention provides for an electronic toll collection system wherein the reader includes a switching network and a plurality of transceivers operating under the control of a controller. The reader further includes failure detection circuitry for determining whether any of the transceivers have failed based upon the RF outputs of the transceivers. If the controller determines that a transceiver has failed, then it alters the switching pattern such that the switching network excludes the failed transceiver from being connected to the antennas. The reader thereby provides for adaptive RF channel assignment, as the particular transceiver used to excite a particular antenna may be dynamically altered, and the provision of at least two transceivers in the reader ensures transceiver redundancy.

In one aspect, the present application provides an electronic toll collection system for conducting toll transactions with vehicle-mounted transponders travelling in a multi-lane roadway. The electronic toll collection system includes one or more antennas for engaging in RF communications with transponders, each antenna defining a capture zone in a portion of at least one lane of the multi-lane roadway, and two or more RF transceivers, each RF transceiver having an RF port. It also includes a switching network connected to the antennas and to the RF ports of the transceivers, the switching network selectively connecting at least one of the transceivers to at least one of the antennas, and a controller for controlling the switching network and the transceivers. The system further includes failure detection circuitry connected to the RF ports of the transceivers for detecting whether any of the transceivers output an RF signal having a power level below a threshold level, the failure detection circuitry providing a result signal to the controller. The controller is configured to control the switching network to connect the antennas to the transceivers in accordance with a scanning pattern, and the controller is configured to cause the switching network exclude one of the transceivers if the result signal from the failure detection circuitry indicates a failure in the one of the transceivers.

In another aspect, the present application provides a method for adaptively switching transceiver usage in an electronic toll collection system used to conduct toll transactions with vehicle-mounted transponders travelling in a multi-lane roadway. The system includes one or more antennas for engaging in RF communications with transponders, two or more RF transceivers wherein each RF transceiver has an RF port, and a switching network connected to the antennas and to the RF ports of the transceivers, the switching network selectively connecting at least one of the transceivers to at least one of the antennas under control of a controller. The system further includes failure detection circuitry connected to the RF ports for detecting whether any of the transceivers output an RF signal having a power level below a threshold level, the failure detection circuitry providing an output signal to the controller. The method includes steps of designating a set of active transceivers, wherein the set of active transceivers includes at least one of the transceivers, conducting RF communications through one of the antennas using the set of active transceivers, determining that the RF signal from one of the active transceivers falls below a threshold power level, and excluding the one of the active transceivers from the set of active transceivers.

In yet another aspect, the present application provides an electronic toll collection system for conducting toll transactions with vehicle-mounted transponders travelling in a multi-lane roadway. The electronic toll collection system includes one or more antennas for engaging in RF communications with transponders, two or more RF transceivers each having an RF port, controller means for controlling the transceivers to implement a scanning pattern, switching means connected to the antennas and to the RF ports of the transceivers for selectively connecting at least one of the transceivers to at least one of the antennas under control of the controller means, and failure detection means connected to the RF ports of the transceivers for detecting whether any of the transceivers output an RF signal having a power level below a threshold level, the failure detection means providing a result signal to the controller means. The controller means further includes means for causing the switching means to connect the antennas to the transceivers in accordance with a scanning pattern, and the controller means includes means for causing the switching network exclude one of the transceivers if the result signal from the failure detection means indicates a failure in the one of the transceivers.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

Figure 1:
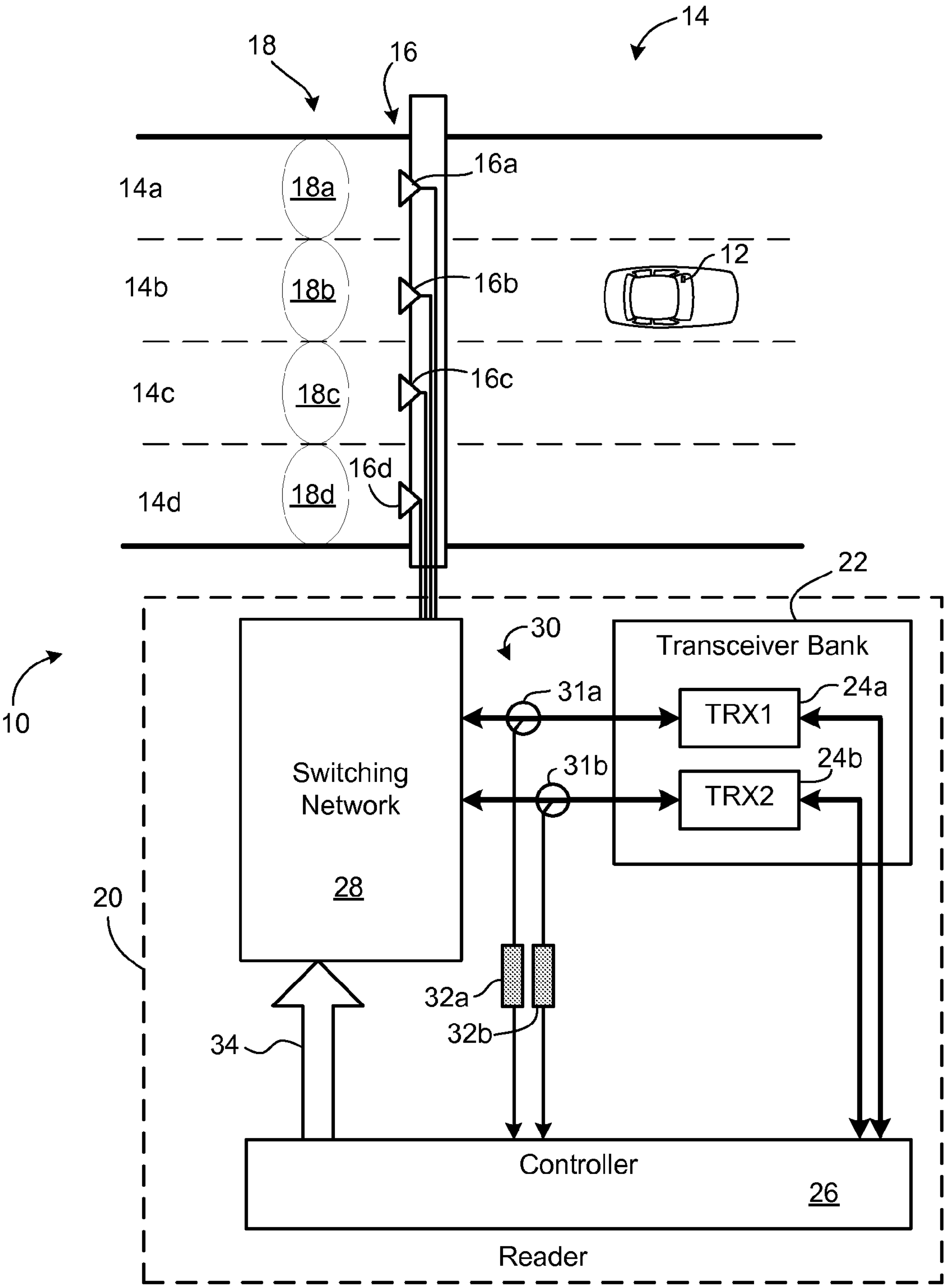
FIG. 1 shows a block diagram of an embodiment of an electronic toll collection system.
Figure 2:
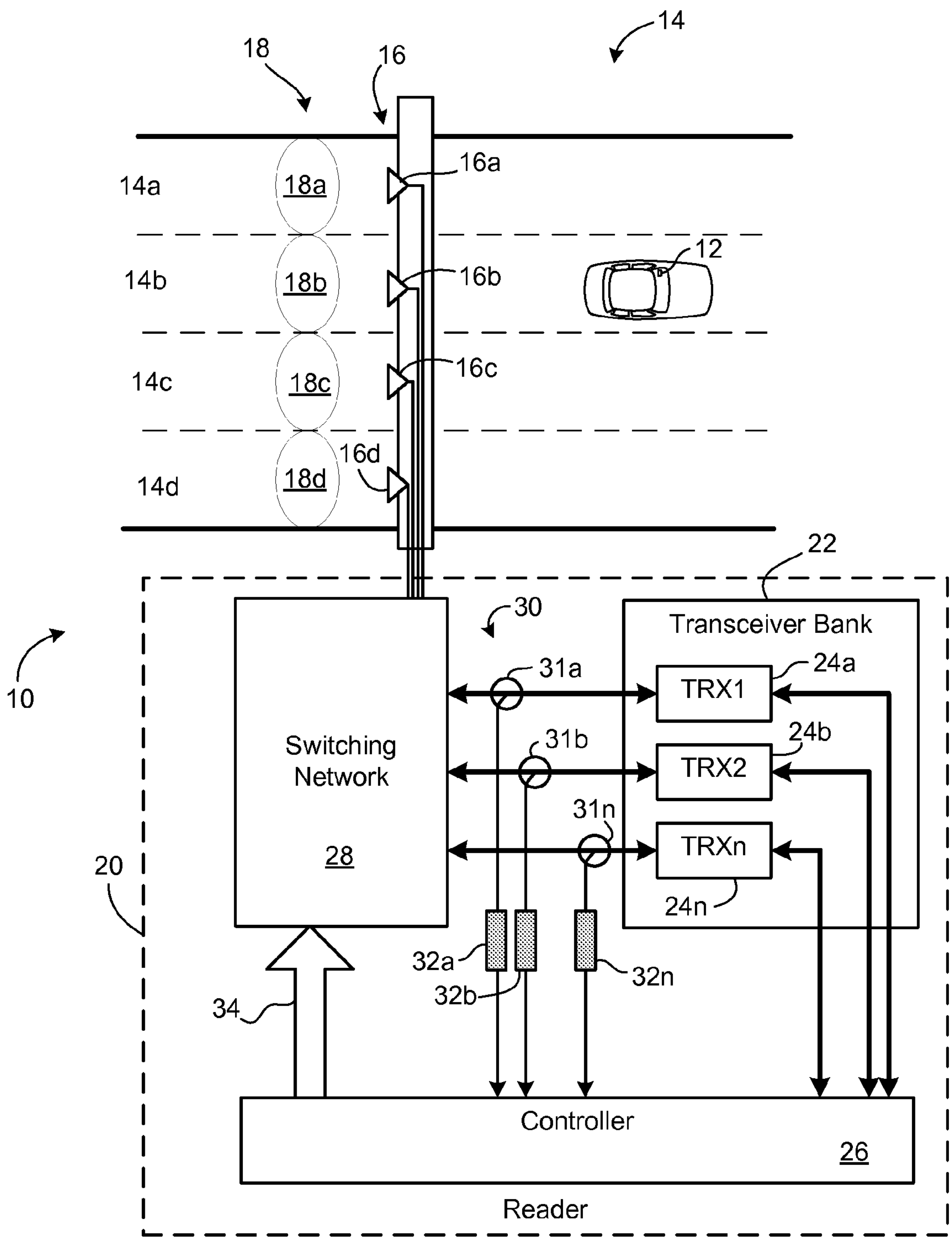
FIG. 2 shows a block diagram of another embodiment of an electronic toll collection system.

Reference is first made to FIGS. 1 and 2, which show block diagrams of embodiments of an electronic toll collection system 10. The system 10 operates to send and receive RF communications with vehicle-borne transponders 12. In some embodiments, the system 10 is associated with a gated toll plaza. In some other embodiments, the system 10 is associated with an open-road toll processing zone. Other applications for the system 10 will be appreciated by those skilled in the art.

In the embodiments shown in FIGS. 1 and 2, the system 10 is associated with a multi-lane roadway 14. Individual lanes are shown as lanes 14*a*, 14*b*, 14*c*, and 14*d*.

The system 10 includes a set of antennas 16 (shown individually as 16*a*, 16*b*, 16*c*, and 16*d*). FIG. 1 shows that each antenna 16 is associated with a laneway. In particular, each antenna 16 is a directional antenna having a beam path that defines an antenna-specific capture zone 18 within the roadway 14. The antennas 16 may, in some embodiments, be mounted to an overhead gantry or other structure.

In many embodiments, the antennas 16 may be positioned such that their respective capture zones 18 span the width of the roadway 14 to ensure total coverage of all lanes of traffic.

It will be appreciated that there may be more antennas 16 or fewer antennas 16 than lanes in the roadway 14. In one embodiment, midpoint or mid-lane antennas are also deployed defining a capture zone roughly centered at the midpoint between lanes. The mid-lane antennas provide overlapping coverage with the center-lane antennas 16 and may be useful in determining lane position of a transponder 12 within the roadway 14. Other configurations of the antennas 16 will be appreciated by those skilled in the art.

The antennas 16 are connected to a roadside reader 20. The roadside reader 20 excites each antenna 16 so as to induce propagation of an RF signal in the associated capture zone 18. The antenna 16 receives incoming RF signals, which are input to the reader 30. The incoming RF signals include transmissions from any active transponders within the capture zone 18. It will be appreciated that the electronic toll collection system 10 may be based upon one or more pre-defined communications protocols and may involve the use of active or backscatter transponders.

The pre-defined communications protocols used in the system 10 include propagation of a trigger signal or wake-up signal by the antennas 16 in their respective capture zones 18. Any transponder 12 within a particular capture zone 18 may respond by transmitting a response signal, which is received by the antenna 16 and input to the reader 20.

In many embodiments, the reader 20 employs a time multiplexed scan, whereby each antenna 16 is assigned a time slot within which the antenna 16 broadcasts its trigger signal and awaits a response, if any. In the embodiments depicted in FIGS. 1 and 2, the protocol may provide for four time slots during which each antenna is sequentially used to poll for transponders 12 in its respective capture zone 18.

The roadside reader 20 includes a transceiver bank 22 and a controller 26. The transceiver bank 22 contains two or more transceivers 24. In FIG. 1, the transceiver bank 22 includes a first transceiver 24*a* and a second transceiver 24*b*. FIG. 2 presents the more general case of n transceivers. The transceivers 24 are configured to modulate signals from the controller 26 for transmission as RF signals over the antennas 16, and to de-modulate RF signals received by the antennas 16 into a form suitable for use by the controller 26. In this regard, the reader 20 employs hardware and signal processing techniques that will be well understood by those skilled in the art. The controller 26 may include a programmable processing unit, volatile and non-volatile memory storing instructions and data necessary for the operation of the controller 26, and communications interfaces to permit the controller 26 to communicate with the transceivers 24.

The transceivers 24 may include one or more operating transceivers and one or more redundant transceivers. Rather than providing a dedicated transceiver for each antenna supplemented by a redundant transceiver for each antenna, the present embodiment includes a number of transceivers M for the number of antennas N, where M is greater than or less than N. In other words, there are either fewer transceivers or more transceivers than antennas. One or more of the transceivers may be designated as operating transceivers M1 and one or more of the transceivers may be designated as redundant transceivers M2. For example, in the embodiment of the system 10 shown in FIG. 1, M=2 and N=4. The first transceiver 24*a* may be an operating transceiver M1 and the second transceiver 24*b* may be a redundant transceiver M2. In another embodiment with ten antennas 16 (N=10), the transceiver bank 22 may, for example, include 4 transceivers (M=4), three of which are operating transceivers (M1=3), and one of which is a redundant transceiver (M2=3). It will be appreciated that M1+M2=M.

Although FIG. 1 shows an embodiment with four antennas and two transceivers, it will be appreciated that other embodiments may have more or fewer antennas and/or more transceivers.

The reader 20 further includes a switching network 28 for selectively connecting one of the transceivers 24*a*, 24*b*, and 24*n*, with one of the antennas 16. In some embodiments, the switching network 28 may only connect one transceiver 24 to one antenna 16 at any given time; however, in other embodiments, the switching network 28 may allow for connections between more than one antenna 16 and respective transceivers 16. For example, with reference to FIG. 2, the switching network 28 may contemporaneously connect the first antenna 16*a* to the first transceiver 24*a* and the fourth antenna 16*d* to the second transceiver 24*b*. In this latter circumstance, the antennas 16 that are contemporaneously connected to a respective one of the transceivers 24 may be spatially displaced to ensure no overlap. In other words, the switching network 28 may not simultaneously connect transceivers 24 to two antennas 16 located in adjacent lanes of the roadway 14, since RF interference may result.

The switching network 28 operates under the control of the controller 26, which causes the switching network 28 to connect and disconnect specified antennas 16 to selected transceivers 24 so as to implement a scanning pattern. The scanning pattern may include a fixed pattern of equal length timeslots. In some embodiments, the scanning pattern may include an adaptive pattern that adjusts to traffic volume differences between the laneways, as described in U.S. provisional 60/718,743, filed Sep. 21, 2005 and owned in common herewith, the contents of which are hereby incorporated.

The reader 20 may further include failure detection circuitry 30 for providing the controller 26 with information from which it may determine if one of the transceivers 24*a*, 24*b*, or 24*n* has failed. Through the detection circuitry 30 the controller 26 may receive a portion or sample of the RF signal output by each of the transceivers 24. Based upon the output signal from a selected transceiver 24, the controller 26 may determine whether the transceiver 24 is functioning normally. If one of the transceivers 24 fails, then the controller 26 may remove it from operation by controlling the switching network 28 such that the failed transceiver 24 is not used. For example, if the first transceiver 24*a* fails, then the switching network 28 may use the second transceiver 24*b* in its place.

In one embodiment, the detection circuitry 30 may include a directional coupler 31*a*, 31*b*, 31*c* for obtaining a portion of each transceiver output. The directional couplers 31 may include a low loss tap for obtaining a small portion of the RF signal without significantly reducing the dBmV of the through signal. In one embodiment, the system 10 operates within the 915 MHz frequency band. In other embodiments, the system 10 may use other frequency bands, such as, for example, 5.9 GHz. By way of example only, to minimize impact on the power transmitted to the antenna 16, the directional coupler 31 may be a 20 dB tap in which 99% of the power of the input signal passes through the directional coupler 31 and 1% of the power is split off for use in failure detection, as is described below. Selection of an appropriate directional coupler 31 for a specific application will be within the knowledge of a person ordinarily skilled in the art.

The detection circuitry 30 may also include threshold circuitry 32*a*, 32*b*, 32*c*, for determining whether the RF power level of the tapped signal drops below a threshold level. The threshold level may be predetermined or may be controlled dynamically by the controller 26. Output signals from the threshold circuitry 32 corresponding to each transceiver 24 may be input to the controller 26. On this basis, the controller 26 may assess whether the individual transceivers 24 are operating normally. The threshold circuitry 32 may include various discrete components, including filters, etc., for determining or detecting the power level of an RF signal and comparing it against a threshold level, as will be appreciated by those of ordinary skill in the art.

Figure 3:
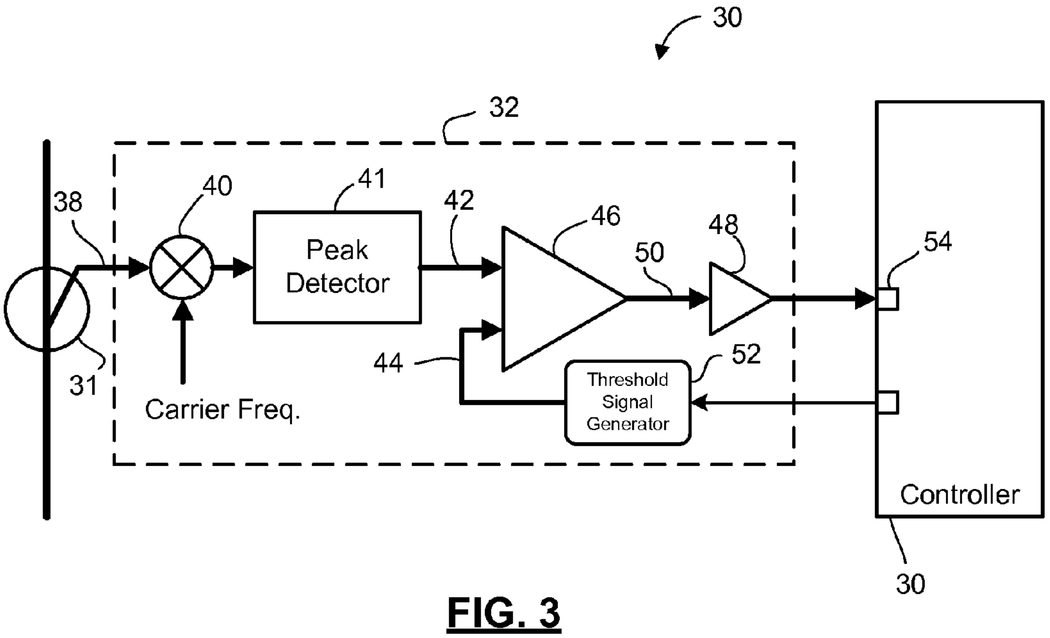
FIG. 3 diagrammatically shows an embodiment of failure detection circuitry from the electronic toll collection systems of FIGS. 1 and 2.

Reference is made to FIG. 3, which diagrammatically shows an example embodiment of the failure detection circuitry 30. The circuitry 30 includes the directional coupler 31 for obtaining a portion of the output signal from the transceiver 24 (FIG. 1). The directional coupler 31 outputs the portion as a tapped signal 38. The tapped signal 38 is input to the threshold circuitry 32. In this embodiment, the threshold circuitry 32 includes a down-converter or mixer 40 and a peak detector 41. The mixer 40 receives the tapped signal 38 and the carrier frequency, which in some embodiments is in the 915 MHz band, and outputs a baseband or IF signal. This signal is then input to the peak detector 41, which outputs a DC signal 42 that has a voltage level that may be used as a proxy for measuring the power output level of the transceiver 24.

The threshold circuitry 32 may also include a comparator 46. The comparator 46 receives, as inputs, the DC signal 42 and a threshold signal 44. The threshold signal 44 has a pre-set DC level that represents the minimum level that the DC signal 42 must exhibit. If the DC signal 42 falls below the threshold signal 44 level, it is indicative that the output power of the transceiver 24 has fallen below the minimum level permitted. The threshold signal 44 may be predetermined through a voltage divider within the threshold circuitry 32. In another embodiment, the threshold signal 44 is generated by a digital circuit pre-programmed to output the threshold signal 44 and the predetermined level. In yet another embodiment, the threshold signal 44 is output by a signal generator circuit 52 operating under the control of the controller 26. In such an embodiment, the controller 26 may adjust the level of the threshold signal 44 from time-to-time.

The comparator 46 outputs a result signal 50 based upon the comparison between the DC signal 42 and the threshold signal 44. For example, the comparator 46 may output a LOW signal if the DC signal 42 remains above the threshold signal 44, and may output a HIGH signal if the DC signal 42 falls below the threshold signal 44. In some embodiments, the comparator 46 may be implemented using an op-amp or similar integrated circuit. The result signal 50 may be buffered through a buffer circuit 48 before being input to a failure detection input port 54 of the controller 26.

Figure 4:
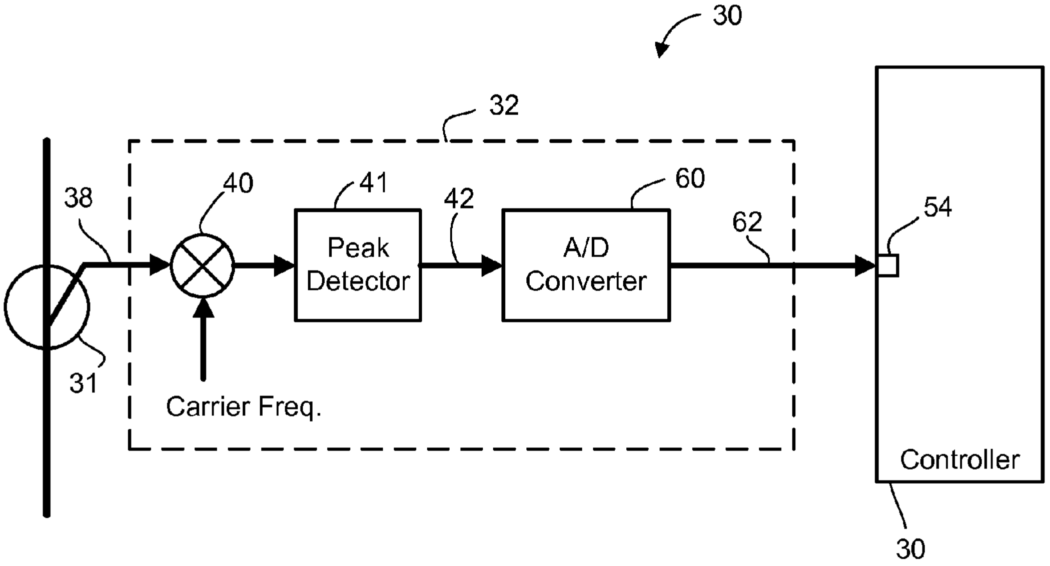
FIG. 4 diagrammatically shows another embodiment of the failure detection circuitry.

Reference is now made to FIG. 4, which shows an alternative embodiment of the failure detection circuitry 30. In this embodiment, the failure detection circuitry 30 includes the mixer 40 and the peak detector 41 and includes an analog-to-digital converter 60 for receiving the DC signal 42 and converting it to a digital signal 62. The analog-to-digital converter 60 quantizes and digitizes the DC signal 42, outputting the digital signal 62 containing data regarding the signal level of the DC signal 42. The digital signal 62 may then be input to the controller 26, which may, through operations implemented in software or firmware, analyze the digital signal 62 to detect whether the output signal level of the transceiver 24 falls below a predetermined threshold.

Other methods and mechanisms for implementing the failure detection circuitry 30, and the threshold detection circuitry 32 in particular, will be understood by those of ordinary skill in the art having regard to the present description.

Figure 5:
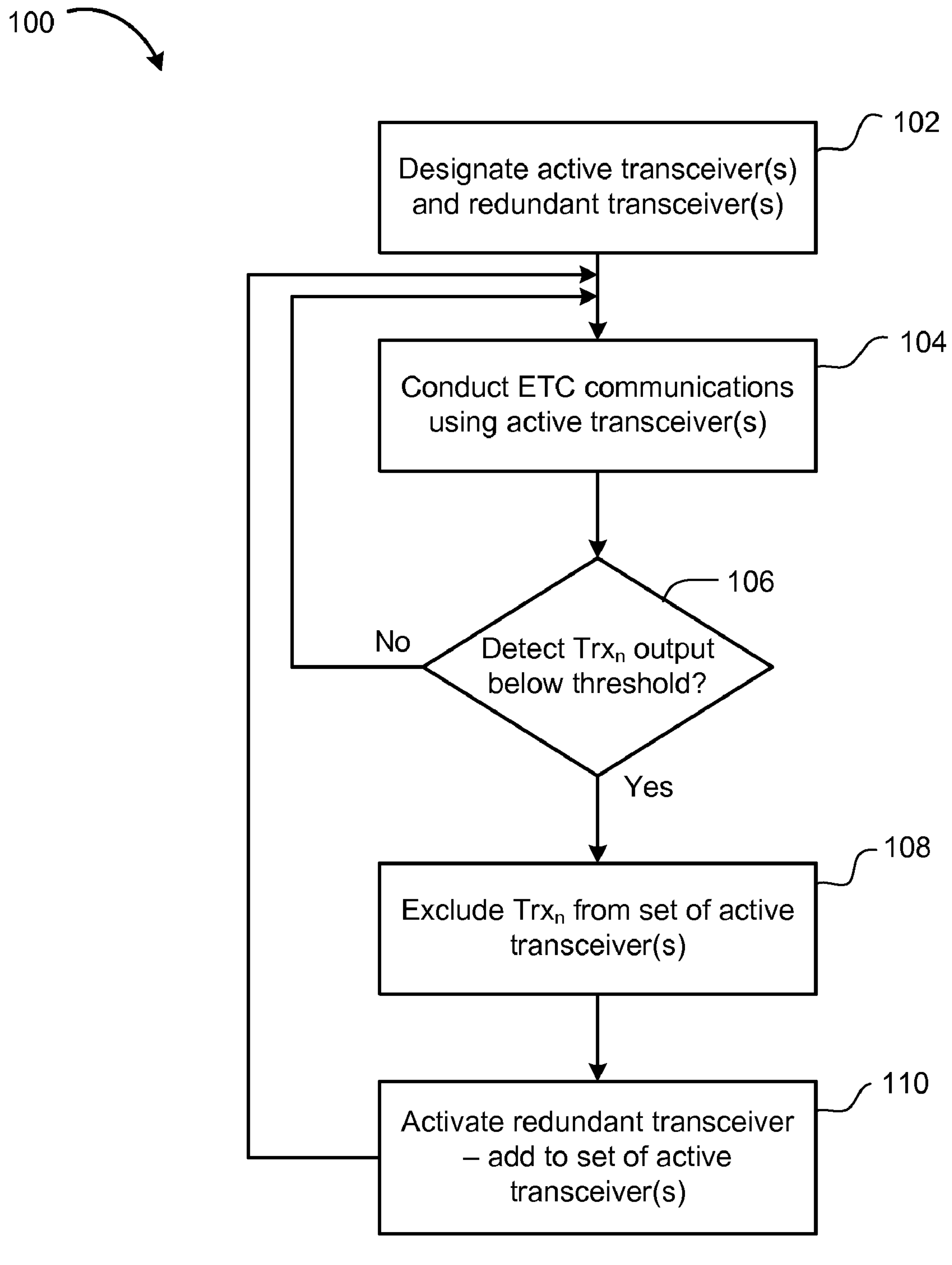
FIG. 5 shows, in flowchart form, a method for adaptively switching transceiver usage in an electronic toll collection system.

Reference is now made to FIG. 5, which shows, in flowchart form, a method 100 for adaptively switching transceiver usage in an electronic toll collection (ETC) system. The ETC system includes, at a given roadside plaza or toll location, N antennas and M transceivers, where N does not equal M.

The method 100 begins in step 102 upon initialization of the ETC system. In step 102, certain parameters and default settings are established. For example, a subset of the M transceivers are designated as the active transceivers. The active transceivers are the transceivers used by the reader to conduct toll transactions with transponders in the roadway in accordance with a scanning pattern. In one embodiment, there is an active transceiver for each of the N antennas. However, in the general case, there are fewer active transceivers than there are antennas, thereby requiring that the reader control a switching network to connect an active transceiver to each antenna in its turn according to the scanning pattern. In one embodiment, there is one active transceiver that is used for all antennas.

The remaining transceiver(s) are designated as redundant transceivers.

In step 104, the ETC system performs its ETC operations through excitation of a selected antenna with one of the active transceivers, in accordance with the scanning pattern. In step 106, the output signal from the active transceiver is tapped and analyzed to determine whether the transceiver is operating correctly. If the power level is sufficient—i.e. above the threshold—then the method returns to step 102 and the ETC system continues its normal operation. If, in step 106, the system determines that one of the active transceivers has an output power level that has fallen below the threshold level, then the method 100 proceeds to step 108.

In step 108, the active transceiver with the low output power is removed/excluded from the set of active transceivers. It may be designated as "failed" or "inoperative", so that it is not used again the ETC operation until repaired. The ETC system may output an indicator to alert an operator to the need for repair. For example, the ETC system may output a failure signal through a communications port. The ETC system may also or alternatively, provide a visual indicator, such illuminating an LED on the reader, intended to alert personnel to the need for repair. A failure signal may include data regarding the nature of the error detected and identifying the transceiver.

In step 110, if a redundant transceiver is available, then the redundant transceiver may be added to the set of active transceivers in place of the failed transceiver.

It will be appreciated that step 110 may not always be carried out. For example, in some cases there may be no redundant transceivers available. Provided that the ETC system contains at least one active transceiver in addition to the failed transceiver, then the ETC system may continue to operate without adding a redundant transceiver. However, if the failed transceiver was the only active transceiver and there are no redundant transceivers available, then the ETC system may be unable to continue to operate until adjustments or repairs are made to one or more of the transceivers.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An electronic toll collection system for conducting toll transactions with vehicle-mounted transponders travelling in a multi-lane roadway, the electronic toll collection system comprising:

one or more antennas for engaging in RF communications with transponders, each antenna defining a capture zone in a portion of at least one lane of the multi-lane roadway;

two or more RF transceivers, each RF transceiver having an RF port;

a switching network connected to the antennas and to the RF ports of the transceivers, the switching network selectively connecting at least one of said transceivers to at least one of said antennas;

a controller for controlling the switching network and the transceivers; and failure detection circuitry connected to the RF ports of the transceivers for detecting whether any of the transceivers output an RF signal having a power level below a threshold level, the failure detection circuitry providing a result signal to the controller, whereby the controller is configured to control the switching network to connect the antennas to the transceivers in accordance with a scanning pattern, and wherein the controller is configured to cause the switching network exclude one of the transceivers if the result signal from the failure detection circuitry indicates a failure in said one of the transceivers.

2. The system claimed in claim 1, wherein said failure detection circuitry comprises a directional coupler providing a tapped signal through a tap port and a threshold circuit for comparing the power level of said tapped signal with a threshold.

3. The system claimed in claim 2, wherein said threshold circuit comprises a down-converter and a peak detector for receiving said tapped signal and producing a DC signal, and a comparator for receiving the DC signal and a predefined threshold signal.

4. The system claimed in claim 1, wherein one or more of said transceivers comprise active transceivers and at least one of said transceivers comprises a redundant transceiver, and wherein said controller is configured to re-designate said redundant transceiver as one of said active transceivers if the result signal from the failure detection circuitry indicates a failure in said one of the transceivers, thereby replacing said one of the transceivers with said redundant transceiver.

5. The system claimed in claim 1, wherein the failure detection circuitry is at least partly implemented by said controller.

6. A method for adaptively switching transceiver usage in an electronic toll collection system used to conduct toll transactions with vehicle-mounted transponders travelling in a multi-lane roadway, the system including one or more antennas for engaging in RF communications with transponders, two or more RF transceivers wherein each RF transceiver has an RF port, and a switching network connected to the antennas and to the RF ports of the transceivers, the switching network selectively connecting at least one of the transceivers to at least one of the antennas under control of a controller, and wherein the system further includes failure detection circuitry connected to the RF ports for detecting whether any of the transceivers output an RF signal having a power level below a threshold level, the failure detection circuitry providing an output signal to the controller, the method comprising steps of:

designating a set of active transceivers, wherein the set of active transceivers includes at least one of said transceivers;

conducting RF communications through one of the antennas using said set of active transceivers;

determining that the RF signal from one of said active transceivers falls below a threshold power level; and excluding said one of said active transceivers from the set of active transceivers.

7. The method claimed in claim 6, wherein the step of designating further includes designating one of said transceivers as a redundant transceiver, and wherein said method further includes a step of adding said redundant transceiver to said set of active transceivers in place of said one of said active transceivers in response to said step of determining.

8. The method claimed in claim 6, wherein said step of determining includes measuring a power level of the RF signal and comparing the power level with said threshold power level.

9. The method claimed in claim 8, wherein said step of determining includes tapping the RF signal to obtain a tapped signal, and comparing the power of the tapped signal with a preset threshold.

10. The method claimed in claim 9, wherein said step of comparing includes down-converting and peak detecting the tapped signal to create a DC voltage signal, and comparing the DC voltage signal with a threshold voltage signal.

11. The method claimed in claim 6, wherein said steps of conducting and determining include transmitting an RF trigger signal and measuring the power level of said RF trigger signal at the RF port.

12. An electronic toll collection system for conducting toll transactions with vehicle-mounted transponders travelling in a multi-lane roadway, the electronic toll collection system comprising:

one or more antennas for engaging in RF communications with transponders;

two or more RF transceivers, each RF transceiver having an RF port;

controller means for controlling the transceivers to implement a scanning pattern switching means connected to the antennas and to the RF ports of the transceivers, the switching means selectively connecting at least one of said transceivers to at least one of said antennas under control of the controller means; and failure detection means connected to the RF ports of the transceivers for detecting whether any of the transceivers output an RF signal having a power level below a threshold level, the failure detection means providing a result signal to the controller means, wherein the controller means further includes means for causing the switching means to connect the antennas to the transceivers in accordance with a scanning pattern, and wherein the controller means includes means for causing the switching network exclude one of the transceivers if the result signal from the failure detection means indicates a failure in said one of the transceivers.

13. The system claimed in claim 12, wherein one or more of said transceivers comprise active transceivers and at least one of said transceivers comprises a redundant transceiver, and wherein said controller means further comprises means for re-designating said redundant transceiver as one of said active transceivers in response to said result signal.

14. The system claimed in claim 12, wherein said failure detection means includes envelope detection means for performing envelope detection upon said RF signal and outputting a voltage signal.

15. The system claimed in claim 14, wherein said failure detection means further comprises comparing means for comparing said voltage signal with a threshold voltage signal to determine whether the power level of said RF signal is below said threshold level.

* * * * *